(12) United States Patent
Mai et al.

(10) Patent No.: US 11,913,704 B2
(45) Date of Patent: Feb. 27, 2024

(54) THREE-PIPE MULTI-SPLIT SYSTEM AND CONTROL METHOD THEREOF

(71) Applicant: Guangdong Giwee Technology Co. Ltd., Foshan (CN)

(72) Inventors: Xiangshi Mai, Foshan (CN); Hongbin Liu, Foshan (CN); Defu Gao, Foshan (CN)

(73) Assignee: GUANGDONG GIWEE TECHNOLOGY CO. LTD., Foshan (CN)

( * ) Notice: Subject to any disclaimer, the term of this patent is extended or adjusted under 35 U.S.C. 154(b) by 123 days.

(21) Appl. No.: 17/722,666

(22) Filed: Apr. 18, 2022

(65) Prior Publication Data

US 2022/0333836 A1    Oct. 20, 2022

(51) Int. Cl.
| | |
|---|---|
| *F25D 21/00* | (2006.01) |
| *F25D 21/12* | (2006.01) |
| *F25B 41/26* | (2021.01) |
| *F25B 13/00* | (2006.01) |

(52) U.S. Cl.
CPC ............ *F25D 21/002* (2013.01); *F25B 13/00* (2013.01); *F25B 41/26* (2021.01); *F25D 21/12* (2013.01)

(58) Field of Classification Search
CPC .......... F25B 13/00; F25B 41/26; F25B 47/02; F25B 49/02; F25D 21/002; F25D 21/12; F24F 11/67; F24F 2110/10; F24F 2110/12; F24F 2140/10; F24F 5/0096; F24F 11/84; F24F 5/001; F24H 4/02; Y02B 30/12
See application file for complete search history.

(56) References Cited

FOREIGN PATENT DOCUMENTS

| | | | | |
|---|---|---|---|---|
| CN | 201876004 U | 6/2011 | | |
| CN | 111486574 A | 8/2020 | | |
| CN | 112524836 A | 3/2021 | | |
| CN | 112594824 A | * 4/2021 | ............ | F24F 11/42 |
| CN | 112594982 A | * 4/2021 | ............ | F25B 45/00 |
| CN | 112594985 A | 4/2021 | | |

OTHER PUBLICATIONS

European Search Report for application EP 22168787.4, dated Sep. 16, 2022, 8 pages.

* cited by examiner

*Primary Examiner* — Kun Kai Ma
(74) *Attorney, Agent, or Firm* — CANTOR COLBURN LLP

(57) ABSTRACT

A three-pipe multi-split system. The three-pipe multi-split system includes an outdoor unit, a plurality of indoor units, and a plurality of hydraulic modules connected respectively by air pipes, liquid pipes, and condensate water pipes. The outdoor unit includes a compressor, a high-pressure pressure sensor, an oil separator, a first switching device, a second switching device, a third switching device, a finned heat exchanger, a compressor heat dissipation module, a plate type heat exchanger, a first electronic expansion valve, a second electronic expansion valve, a filling needle valve, an air-liquid separator, a low-voltage switch, a first electromagnetic valve, a second electromagnetic valve, a third electromagnetic valve, a fourth electromagnetic valve, a fifth electromagnetic valve, an outdoor unit fan, and an outdoor unit temperature detection subassembly; each indoor unit includes an indoor unit heat exchanger, a third electronic expansion valve, an indoor unit fan, and an indoor unit temperature detection subassembly.

10 Claims, 1 Drawing Sheet

US 11,913,704 B2

THREE-PIPE MULTI-SPLIT SYSTEM AND CONTROL METHOD THEREOF

FOREIGN PRIORITY

This application claims priority to Chinese Patent Application No. 202110411109.4, filed Apr. 16, 2021, and all the benefits accruing therefrom under 35 U.S.C. § 119, the contents of which in its entirety are herein incorporated by reference.

TECHNICAL FIELD OF INVENTION

The present invention relates to the technical field of air conditioners, in particular to a three-pipe multi-split system and a control method thereof.

BACKGROUND OF THE INVENTION

In a process of preparing cold water and hot water with hydraulic modules in an existing three-pipe multi-split system. When an air-conditioning system is in a heating mode, since coolants in three coolant pipes of the conventional three-pipe multi-split system connected to indoor units and hydraulic modules are all high-pressure coolants, if the coolant to a certain hydraulic module is to be cut off, an electromagnetic valve and an electronic expansion valve that control the hydraulic module have to be closed. At this time, some high-pressure liquid coolants and some compressor lubricating oil will remain in the hydraulic module, resulting in reduced coolant and lubricating oil operating in the system and affecting the reliability of the system. Moreover, in a standby mode, the electromagnetic valve and the electronic expansion valve of the hydraulic module will be closed, so that some high-pressure coolants remain in a pipe between the electromagnetic valve and the electronic expansion valve. When the temperature of the high-pressure liquid coolants remaining in the hydraulic module dramatically changes, the pipe between the closed electromagnetic valve and electronic expansion valve of the hydraulic module is equivalent to a closed container, and the coolant inside the pipe expands due to a temperature change. As a result, a pressure inside the hydraulic module is high. When the pressure of the sealed section is higher than the maximum pressure that the pipe can bear, pipe damage is likely to occur, and the hydraulic module is damaged. In addition, in the heating process of an air conditioner in the existing three-pipe multi-split system, since the coolants in the three pipes connected to the indoor units and the hydraulic modules are all high-pressure coolants, the hydraulic modules cannot realize a cooling function in the heating process of the air conditioner, which severely affects the application scope of the three-pipe multi-split system. Moreover, recovery of cold air cannot be achieved, resulting in waste of energy. The conventional three-pipe multi-split system cannot produce cooling water in the heating mode of the air conditioner, and neither can use the hydraulic modules for cold water production to recycle heat for non-stop defrosting.

SUMMARY OF THE INVENTION

The present invention aims to at least solve one of the technical problems in the existing art. In addition, the present invention provides a three-pipe multi-split system and a control method thereof. The three-pipe multi-split system and the control method thereof can avoid the situation of reduced coolants and shortage of oil, and ensure the operation reliability of the system.

In a first aspect, an embodiment of the present invention provides a three-pipe multi-split system. The three-pipe multi-split system includes an outdoor unit, a plurality of indoor units, and a plurality of hydraulic modules connected respectively by air pipes, liquid pipes, and condensate water pipes.

The outdoor unit includes a compressor, a high-pressure pressure sensor, an oil separator, a first switching device, a second switching device, a third switching device, a finned heat exchanger, a compressor heat dissipation module, a plate type heat exchanger, a first electronic expansion valve, a second electronic expansion valve, a filling needle valve, an air-liquid separator, a low-voltage switch, a first electromagnetic valve, a second electromagnetic valve, a third electromagnetic valve, a fourth electromagnetic valve, a fifth electromagnetic valve, an outdoor unit fan, and an outdoor unit temperature detection subassembly.

Each indoor unit includes an indoor unit heat exchanger, a third electronic expansion valve, an indoor unit fan, and an indoor unit temperature detection subassembly.

Each hydraulic module includes a coolant-water heat exchanger, a water pump, a water temperature detection sensor, a water flow switch, a sixth electromagnetic valve, a seventh electromagnetic valve, and a fourth electronic expansion valve.

According to some embodiments of the present invention, the outdoor unit temperature detection subassembly includes an exhaust air temperature sensor, an ambient temperature sensor, a condenser temperature sensor, and an outdoor unit heat exchanger temperature sensor.

According to some embodiments of the present invention, the indoor unit temperature detection subassembly includes an indoor unit ambient temperature sensor, a middle part temperature sensor for indoor unit heat exchanger, and an outlet temperature sensor for indoor unit heat exchanger.

According to some embodiments of the present invention, the first switching device, the second switching device, and the third switching device are four-way valves.

According to some embodiments of the present invention, a switch valve externally connected to the outdoor unit is further included, and the switch valve includes a liquid-side stop valve, an air-side stop valve, and a hydraulic module stop valve.

The liquid-side stop valve is connected to liquid pipes of the indoor units and the hydraulic modules; and the air-side stop valve is connected to air pipes of the indoor units.

The hydraulic module stop valves are connected to air pipes of the hydraulic modules.

According to some embodiments of the present invention, the first switching device, the second switching device, and the third switching device are provided with an interface A, an interface B, an interface C, and an interface D.

According to some embodiments of the present invention, the three-pipe multi-split system, wherein the compressor adopts a variable-frequency compressor, or a fixed-speed compressor, or a digital compressor.

A control method of a three-pipe multi-split system according to an embodiment of a second aspect of the present invention is provided. The three-pipe multi-split system is the three-pipe multi-split system according to the embodiment of the first aspect of the present invention. The control method includes the following steps: detecting an operation mode of the indoor units; when the indoor units are in a cooling mode, controlling the system to operate according to a first mode; and when the indoor units are in a heating mode, controlling the system to operate according to a second mode.

According to some embodiments of the present invention, the control method further includes: controlling the system to operate according to the first mode as follows: controlling the first switching device to be powered off, the second switching device to be powered on or powered off according to cooling, hot water production, and cold water production requirements, and the third switching device to be powered on; to achieve cooling by the hydraulic modules: opening the fourth electronic expansion valves, opening the sixth electromagnetic valves, and closing the seventh electromagnetic valves; to achieve heating by the hydraulic modules: opening the fourth electronic expansion valves, opening the seventh electromagnetic valves, and closing the sixth electromagnetic valves; and to turn off the hydraulic modules: closing the fourth electronic expansion valves, opening the sixth electromagnetic valves, and closing the seventh electromagnetic valves.

According to some embodiments of the present invention, the control method further includes: controlling the system to operate according to the second mode as follows: controlling the first switching device to be powered on, the second switching device to be powered on or powered off according to cooling, hot water production, and cold water production requirements, and the third switching device to be powered off; to achieve heating by the hydraulic modules: opening the fourth electronic expansion valves, opening the seventh electromagnetic valves, and closing the sixth electromagnetic valves; to achieve heating by the hydraulic modules: opening the fourth electronic expansion valves, opening the seventh electromagnetic valves, and closing the sixth electromagnetic valves; and to turn off the hydraulic modules: closing the fourth electronic expansion valves, opening the seventh electromagnetic valves, and closing the sixth electromagnetic valves.

By adoption of the technical solutions of the present invention, the following advantages are achieved:

By optimizing the air-conditioning system and a control logic, regardless of a cooling mode or a heating mode, among the three pipes connecting the outdoor unit to the indoor units and the hydraulic modules, there is always one pipe in which the coolant will be kept in a low-pressure state and communicated to an air return port of the compressor, so that a liquid coolant remaining in the stopped hydraulic module can flow back to the compressor through a low-pressure pipe to avoid such phenomena of reduced coolants and shortage of oil and ensure the operation reliability of the system.

It is ensured through the system and the control logic that among the three pipes of the multi-split system, there is always one pipe being at a low pressure and communicated to a low-pressure side connected to the air return port of the compressor, so that the coolant in the standby or stopped hydraulic module is sucked away by such pipe, thus avoiding the pipe system of the hydraulic module from being broken due to the expansion, in the pipe of the hydraulic module, of the liquid coolant remaining in the hydraulic module caused by a change in the ambient temperature.

It is ensured through the system and the control logic that among the three pipes of the multi-split system, there is always one pipe being at a low pressure and communicated to the air return port of the compressor, so that in the heating mode of the indoor unit, it is still possible for the hydraulic module in the system to produce cold water, and the application range of the multi-split system is expanded. In addition, cooling air is recovered, and the purposes of energy conservation and emission reduction are achieved.

It is ensured through the system and the control logic that among the three pipes of the multi-split system, there is always one pipe being at a low pressure and communicated to the air return port of the compressor, so that in the heating mode of the air conditioner, cooling air for producing cold water can be recovered as long as there is a hydraulic module being in a cold water production mode, thus enlarging an area of an evaporation side and delaying defrosting of the heat exchanger of the outdoor unit.

In addition, under the condition that there is a hydraulic module producing cold water, non-stop defrosting of the outdoor unit is realized, thus avoiding controlling the four-way valves of the indoor units and the hydraulic modules to be reversed, ensuring that the indoor units and the hydraulic modules for producing hot water are not affected, and avoiding changes in an indoor temperature and water temperatures of the hydraulic modules. Noise caused by reversing of the four-way valves of the indoor side is also avoided, and the reliability of the system, and the user experience are improved.

BRIEF DESCRIPTION OF THE DRAWINGS

In order to explain the technical solutions of the embodiments of the present invention more clearly, the following will briefly introduce the accompanying drawings used in the description of the embodiments. Apparently, the drawings in the following description are some embodiments of the present invention. Those of ordinary skill in the art can obtain other drawings based on these drawings without creative work.

DETAILED DESCRIPTION OF THE INVENTION

Figure 1:
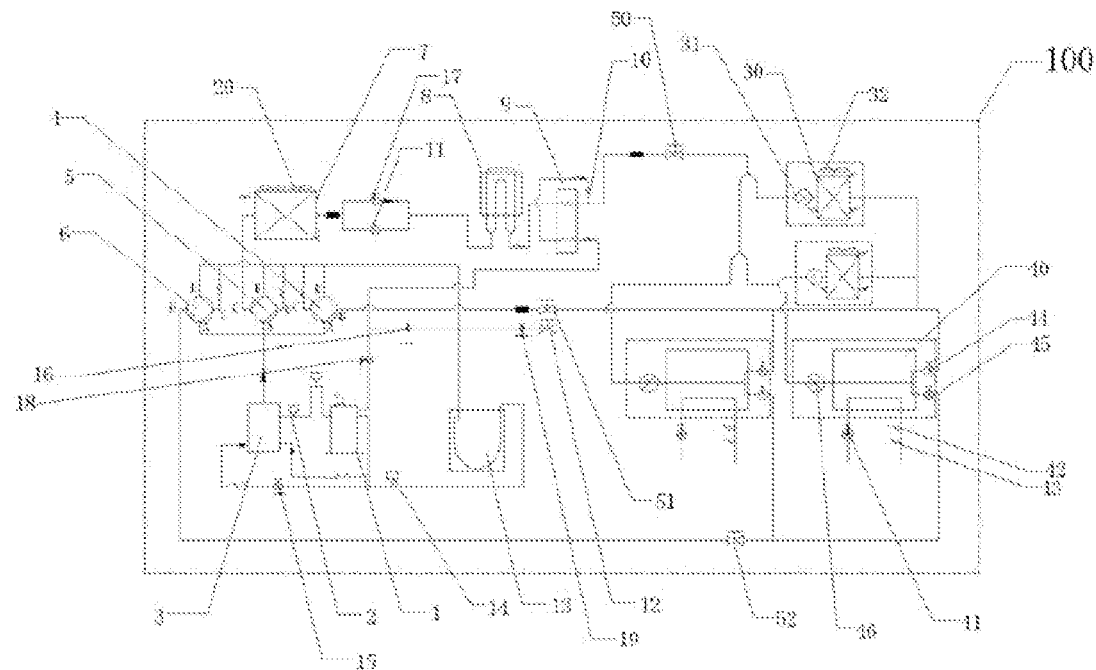
FIG. 1 is a schematic structural diagram of a three-pipe multi-split system provided by the present invention.

The embodiments of the present invention are described in detail below. Examples of the embodiments are shown in the accompanying drawings. The same or similar reference numerals represent the same or similar elements or elements having the same or similar functions throughout. The embodiments described below with reference to the drawings are exemplary, and are only intended to explain the present invention, and should not be construed as limiting the present invention.

In the description of the present invention, it should be understood that orientations or positional relationships indicated by the terms "center", "longitudinal", "transverse", "length" "width", "thickness", "upper", "lower", "front", "rear", "left", "right", "vertical", "horizontal", "top", "bottom", "inside", "outside", "clockwise", "anticlockwise", "axial", "radial", "circumferential" and the like are orientations or positional relationships as shown in the drawings, and are only for the purpose of facilitating and simplifying the description of the present invention instead of indicating or implying that apparatuses or elements indicated must have particular orientations, and be constructed and operated in the particular orientations, so that these terms are not construed as limiting the present invention. In addition, features defined by "first" and "second" can explicitly instruct or impliedly include one or more features. In the description of the present invention, unless otherwise indicated, "plurality" means two or more.

In the description of the present invention, it should be also noted that unless otherwise explicitly defined and defined, the terms "mounted", "coupled" and "connected" shall be understood broadly, and may be, for example, fixedly connected, or detachably connected, or integrally connected, or mechanically connected, or electrically connected, or directly connected, or indirectly connected through an intermediate medium, or interconnection between two elements. Those of ordinary skill in the art can understand the specific meanings of the above terms in the present invention according to specific situations.

An embodiment of the present invention provides a three-pipe multi-split system 100. Referring to FIG. 1, the three-pipe multi-split system 100 includes an outdoor unit, a plurality of indoor units, and a plurality of hydraulic modules connected respectively by air pipes, liquid pipes, and condensate water pipes.

The outdoor unit includes a compressor 1, a high-pressure pressure sensor 2, an oil separator 3, a first switching device 4, a second switching device 5, a third switching device 6, a finned heat exchanger 7, a compressor heat dissipation module 8, a plate type heat exchanger 9, a first electronic expansion valve 10, a second electronic expansion valve 11, a filling needle valve 12, an air-liquid separator 13, a low-voltage switch 14, a first electromagnetic valve 15, a second electromagnetic valve 16, a third electromagnetic valve 17, a fourth electromagnetic valve 18, a fifth electromagnetic valve 19, an outdoor unit fan 20, and an outdoor unit temperature detection subassembly.

Each indoor unit includes an indoor unit heat exchanger 30, a third electronic expansion valve 31, an indoor unit fan 32, and an indoor unit temperature detection subassembly.

Each hydraulic module includes a coolant-water heat exchanger 40, a water pump 41, a water temperature detection sensor 42, a water flow switch 43, a sixth electromagnetic valve 44, a seventh electromagnetic valve 45, and a fourth electronic expansion valve 46.

The outdoor unit temperature detection subassembly includes an exhaust air temperature sensor, an ambient temperature sensor, a condenser temperature sensor, and an outdoor unit heat exchanger temperature sensor.

The indoor unit temperature detection subassembly includes an indoor unit ambient temperature sensor, a middle part temperature sensor for indoor unit heat exchanger 30, and an outlet temperature sensor for indoor unit heat exchanger 30.

The first switching device 4, the second switching device 5, and the third switching device 6 are four-way valves.

According to some embodiments of the present invention, a switch valve externally connected to the outdoor unit is further included, and the switch valve includes a liquid-side stop valve 50, an air-side stop valve 51, and a hydraulic module stop valve 52.

The liquid-side stop valve 50 is connected to liquid pipes of the indoor units and the hydraulic modules; the air-side stop valve 51 is connected to air pipes of the indoor units.

The hydraulic module stop valves 52 are connected to air pipes of the hydraulic modules.

The first switching device 4, the second switching device 5, and the third switching device 6 are provided with an interface A, an interface B, an interface C, and an interface D.

According to the three-pipe multi-split system 100, wherein the compressor 1 adopts a variable-frequency compressor 1, or a fixed-speed compressor 1, or a digital compressor 1.

Thus, by optimizing an air-conditioning system, regardless of a cooling mode or a heating mode, among the three pipes connecting the outdoor unit to the indoor units and the hydraulic modules, there is always one pipe in which the coolant will be kept in a low-pressure state and communicated to an air return port of the compressor 1, so that a liquid coolant remaining in the stopped hydraulic module can flow back to the compressor 1 through the low-pressure pipe to avoid such phenomena of reduced coolants and shortage of oil and ensure the operation reliability of the system. In addition, it is ensured through the system that among the three pipes of the multi-split system 100, there is always one pipe being at a low pressure and communicated to a low-pressure side connected to the air return port of the compressor 1, so that the coolant in the standby or stopped hydraulic module is sucked away by such pipe, thus avoiding the pipe system of the hydraulic module from being broken due to the expansion, in the pipe of the hydraulic module, of the coolant remaining in the hydraulic module caused by a change in the ambient temperature. Among the three pipes of the multi-split system 100, there is always one pipe being at a low pressure and communicated to the air return port of the compressor 1, so that in the heating mode of the indoor unit, it is still possible for the hydraulic module in the system to produce cold water, and the application range of the multi-split system 100 is expanded. In addition, cooling air is recovered, and the purposes of energy conservation and emission reduction are achieved. Among the three pipes of the multi-split system 100, there is always one pipe being at a low pressure and communicated to the air return port of the compressor 1, so that in the heating mode of an air conditioner, cooling air for producing cold water can be recovered as long as there is a hydraulic module being in a cold water production mode, thus enlarging an area of an evaporation side and delaying defrosting of the heat exchanger of the outdoor unit. In addition, under the condition that there is a hydraulic module producing cold water, non-stop defrosting of the outdoor unit is realized, thus avoiding controlling the four-way valves of the indoor units and the hydraulic modules to be reversed, ensuring that the indoor units and the hydraulic modules for producing hot water are not affected, and avoiding changes in an indoor temperature and water temperatures of the hydraulic modules. Noise caused by reversing of the four-way valves of the indoor side is also avoided, and the reliability of the system, and the user experience are improved.

Figure 2:
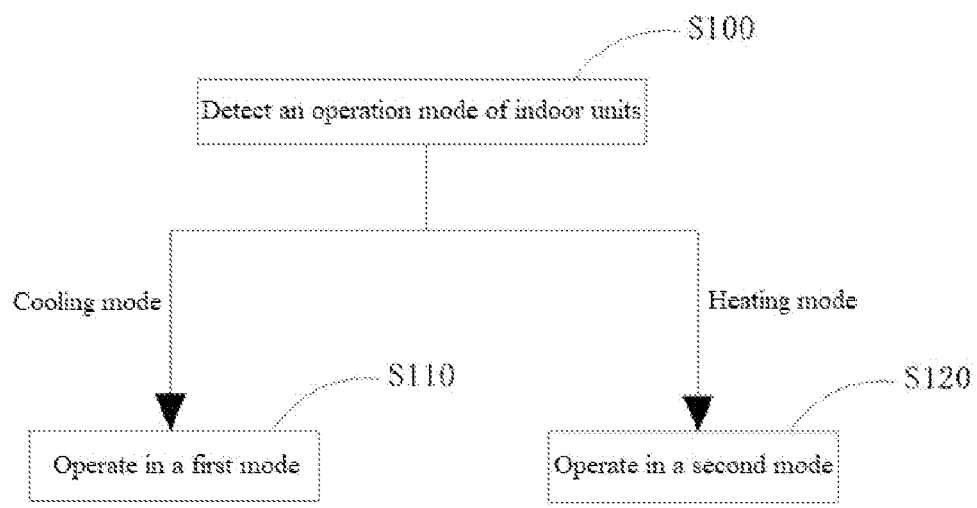
FIG. 2 is a flow chart of a control method of a three-pipe multi-split system provided by the present invention.

A control method of a three-pipe multi-split system 100 according to an embodiment of a second aspect of the present invention is provided. The control method may be executed by a controller (e.g., a microprocessor-based controller) configured to control components of the three-pipe multi-split system 100 as described herein. The three-pipe multi-split system 100 is the three-pipe multi-split system 100 according to the embodiment of the first aspect of the present invention. Referring to FIG. 2, a flow chart of the control method of the three-pipe multi-split system 100 provided by the present invention is illustrated, including the following steps: in step S100: an operation mode of the indoor units is detected; in step S110: when the indoor units are in a cooling mode, the system is controlled to operate according to a first mode; and in step S120: when the indoor units are in a heating mode, the system is controlled to operate according to a second mode.

Controlling the system to operate according to the first mode is as follows: The first switching device 4 is controlled to be powered off; the second switching device 5 is controlled to be powered on or powered off according to cooling, hot water production, and cold water production requirements; the third switching device 6 is controlled to be powered on; to achieve cooling by the hydraulic modules: the fourth electronic expansion valves 46 are opened, the sixth electromagnetic valves 44 are opened, and the seventh electromagnetic valves 45 are closed; to achieve heating by the hydraulic modules: the fourth electronic expansion valves 46 are opened; the seventh electromagnetic valves 45 are opened, and the sixth electromagnetic valves 44 are closed; and to turn off the hydraulic modules: the fourth electronic expansion valves 46 are closed, the sixth electromagnetic valves 44 are opened, and the seventh electromagnetic valves 45 are closed.

In this embodiment, if the indoor units are in the cooling mode, the first switching device 4 is powered off; the interface A is connected to the interface C; the interface B is connected to the interface D; at this time, a coolant in a pipe at the air-side stop valve 51 is in a low-pressure gaseous state; the second switching device 5 is powered on or powered off according to the cooling, hot water production and cold water production requirements, so that the heat exchanger of the outdoor unit is selectively used as an evaporator or a condenser; the third switching device 6 is powered on; at this time, the interface A is connected to the interface B, and the interface C is connected to the interface D; and at this time, a coolant in a pipe at the hydraulic module stop valve 52 is in a high-pressure gaseous state. To achieve cooling by the hydraulic modules, the electronic expansion valves are opened, the sixth electromagnetic valves 44 are opened, and the seventh electromagnetic valves 45 are closed. To achieve heating by the hydraulic modules, the fourth electronic expansion valves 46 are opened, the seventh electromagnetic valves 45 are opened, and the sixth electromagnetic valves 44 are closed. To turn off the hydraulic modules, the fourth electronic expansion valves 46 are closed, the sixth electromagnetic valves 44 are opened, and the seventh electromagnetic valves 45 are closed.

Controlling the system to operate according to the second mode is as follows: The first switching device 4 is controlled to be powered on; the second switching device 5 is controlled to be powered on or powered off according to cooling, hot water production, and cold water production requirements; the third switching device 6 is controlled to be powered off; to achieve heating by the hydraulic modules: the fourth electronic expansion valves 46 are opened, the seventh electromagnetic valves 45 are opened, and the sixth electromagnetic valves 44 are closed; to achieve heating by the hydraulic modules: the fourth electronic expansion valves 46 are opened, the seventh electromagnetic valves 45 are opened, and the sixth electromagnetic valves 44 are closed; and to turn off the hydraulic modules: the fourth electronic expansion valves 46 are closed, the seventh electromagnetic valves 45 are opened, and the sixth electromagnetic valves 44 are closed.

In this embodiment, if the indoor units are in the heating mode, the first switching device 4 is powered on; the interface A is connected to the interface B; the interface C is connected to the interface D; at this time, the coolant in the pipe at the air-side stop valve 51 is in a high-pressure gaseous state; the second switching device 5 is powered on or powered off according to the cooling, hot water production and cold water production requirements, so that the heat exchanger of the outdoor unit is selectively used as an evaporator or a condenser; the third switching device 6 is powered off; at this time, the interface A is connected to the interface C, and the interface B is connected to the interface D; and at this time, the coolant in the pipe at the hydraulic module stop valve 52 is in a low-pressure gaseous state. To achieve heating by the hydraulic modules, the electronic expansion valves 46 are opened, the seventh electromagnetic valves 45 are opened, and the sixth electromagnetic valves 44 are closed. To achieve heating by the hydraulic modules, the fourth electronic expansion valves 46 are opened, the seventh electromagnetic valves 45 are opened, and the sixth electromagnetic valves 44 are closed. To turn off the hydraulic modules, the fourth electronic expansion valves 46 are closed, the seventh electromagnetic valves 45 are opened, and the sixth electromagnetic valves 44 are closed.

In conclusion, it can be found that by the control method for optimizing an air-conditioning system, regardless of a cooling mode or a heating mode, among the three pipes connecting the outdoor unit to the indoor units and the hydraulic modules, there is always one pipe in which the coolant will be kept in a low-pressure state and communicated to an air return port of the compressor 1, so that a liquid coolant remaining in the stopped hydraulic module can flow back to the compressor 1 through a low-pressure pipe to avoid such phenomena of reduced coolants and shortage of oil and ensure the operation reliability of the system. In addition, it is ensured through a control logic that among the three pipes of the multi-split system 100, there is always one pipe being at a low pressure and communicated to a low-pressure side connected to the air return port of the compressor 1, so that the coolant in the standby or stopped hydraulic module is sucked away by such pipe, thus avoiding the pipe system of the hydraulic module from being broken due to the expansion, in the pipe of the hydraulic module, of the coolant remaining in the hydraulic module caused by a change in the ambient temperature. Among three pipes of the multi-split system 100, there is always one pipe being at a low pressure and communicated to the air return port of the compressor 1, so that in the heating mode of the indoor unit, it is still possible for the hydraulic module in the system to produce cold water, and the application range of the multi-split system 100 is expanded. In addition, cooling air is recovered, and the purposes of energy conservation and emission reduction are achieved. Among the three pipes of the multi-split system 100, there is always one pipe being at a low pressure and communicated to the air return port of the compressor 1, so that in the heating mode of an air conditioner, cooling air for producing cold water can be recovered as long as there is a hydraulic module being in a cold water production mode, thus enlarging an area of an evaporation side and delaying defrosting of the heat exchanger of the outdoor unit. In addition, under the condition that there is a hydraulic module producing cold water, non-stop defrosting of the outdoor unit is realized, thus avoiding controlling the four-way valves of the indoor units and the hydraulic modules to be reversed, ensuring that the indoor units and the hydraulic modules for producing hot water are not affected, and avoiding changes in an indoor temperature and water temperatures of the hydraulic modules. Noise caused by reversing of the four-way valves of the indoor side is also avoided, and the reliability of the system, and the user experience are improved.

The various embodiments in this specification are described in a progressive manner, and each embodiment focuses on the differences from other embodiments. The same and similar parts between the various embodiments can be referred to each other.

The foregoing description of the disclosed embodiments enables those skilled in the art to implement or use the present invention. Various modifications to these embodiments will be obvious to those skilled in the art, and the general principles defined herein can be implemented in other embodiments without departing from the spirit or scope of the present invention. Therefore, the present invention will not be limited to these embodiments shown in this text, but should conform to the widest scope consistent with the principles and novel features disclosed herein.

What is claimed is:

1. A three-pipe multi-split system, the three-pipe multi-split system comprising an outdoor unit, a plurality of indoor units, and a plurality of hydraulic modules connected respectively by air pipes, liquid pipes, and condensate water pipes, wherein:
   the outdoor unit comprises a compressor, a high-pressure pressure sensor, an oil separator, a first switching device, a second switching device, a third switching device, a finned heat exchanger, a compressor heat dissipation module, a plate type heat exchanger,
   a first electronic expansion valve, a second electronic expansion valve, a filling needle valve, an air-liquid separator, a low-voltage switch, a first electromagnetic valve, a second electromagnetic valve, a third electromagnetic valve, a fourth electromagnetic valve, a fifth electromagnetic valve,
   an outdoor unit fan, and an outdoor unit temperature detection subassembly;
   each indoor unit comprises an indoor unit heat exchanger, a third electronic expansion valve, an indoor unit fan, and an indoor unit temperature detection subassembly; and
   each hydraulic module comprises a coolant-water heat exchanger, a water pump, a water temperature detection sensor, a water flow switch,
   a sixth electromagnetic valve, a seventh electromagnetic valve, and a fourth electronic expansion valve.

2. The three-pipe multi-split system according to claim 1, wherein the outdoor unit temperature detection subassembly comprises an exhaust air temperature sensor, an ambient temperature sensor, a condenser temperature sensor, and an outdoor unit heat exchanger temperature sensor.

3. The three-pipe multi-split system according to claim 1, wherein the indoor unit temperature detection subassembly comprises an indoor unit ambient temperature sensor, a middle part temperature sensor for indoor unit heat exchanger, and an outlet temperature sensor for indoor unit heat exchanger.

4. The three-pipe multi-split system according to claim 1, wherein the first switching device, the second switching device, and the third switching device are four-way valves.

5. The three-pipe multi-split system according to claim 1, further comprising a switch valve externally connected to the outdoor unit, wherein the switch valve comprises a liquid-side stop valve, an air-side stop valve, and a hydraulic module stop valve, wherein the liquid-side stop valve is connected to liquid pipes of the indoor units and the hydraulic modules;
the air-side stop valve is connected to air pipes of the indoor units;
the hydraulic module stop valves are connected to air pipes of the hydraulic modules.

6. The three-pipe multi-split system according to claim 1, wherein the first switching device, the second switching device, and the third switching device are provided with an interface A, an interface B, an interface C, and an interface D.

7. The three-pipe multi-split system according to claim 1, wherein the compressor adopts a variable-frequency compressor, or a fixed-speed compressor, or a digital compressor.

8. A control method of the three-pipe multi-split system according to claim 1, comprising the following steps: detecting an operation mode of the indoor units;
when the indoor units are in a cooling mode, controlling the system to operate according to a first mode; and
when the indoor units are in a heating mode, controlling the system to operate according to a second mode.

9. The control method according to claim 8, further comprising: controlling the system to operate according to the first mode as follows: controlling the first switching device to be powered off, the second switching device to be powered on or powered off according to cooling, hot water production, and cold water production requirements, and the third switching device to be powered on; to achieve cooling by the hydraulic modules: opening the fourth electronic expansion valves, opening the sixth electromagnetic valves, and closing the seventh electromagnetic valves; to achieve heating by the hydraulic modules: opening the fourth electronic expansion valves, opening the seventh electromagnetic valves, and closing the sixth electromagnetic valves; and to turn off the hydraulic modules: closing the fourth electronic expansion valves, opening the sixth electromagnetic valves, and closing the seventh electromagnetic valves.

10. The control method according to claim 8, further comprising: controlling the system to operate according to the second mode as follows: controlling the first switching device to be powered on, the second switching device to be powered on or powered off according to cooling, hot water production, and cold water production requirements, and the third switching device to be powered off; to achieve heating by the hydraulic modules: opening the fourth electronic expansion valves, opening the seventh electromagnetic valves, and closing the sixth electromagnetic valves; to achieve heating by the hydraulic modules: opening the fourth electronic expansion valves, opening the seventh electromagnetic valves, and closing the sixth electromagnetic valves; and to turn off the hydraulic modules: closing the fourth electronic expansion valves, opening the seventh electromagnetic valves, and closing the sixth electromagnetic valves.

* * * * *